(12) United States Patent
Rahaim et al.

(10) Patent No.: US 11,092,013 B2
(45) Date of Patent: Aug. 17, 2021

(54) MODULATED TURBINE COOLING SYSTEM

(71) Applicant: General Electric Company, Schenectady, NY (US)

(72) Inventors: John Joseph Rahaim, Cincinnati, OH (US); Daniel John Fusinato, Cincinnati, OH (US); Scott David Hunter, Seattle, OH (US); Joel Francis Kirk, Middleton, OH (US); Michael Robert Melzak, Cincinnati, OH (US); Curtis Walton Stover, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/236,018

(22) Filed: Dec. 28, 2018

(65) Prior Publication Data
US 2019/0136714 A1 May 9, 2019

Related U.S. Application Data (62) Division of application No. 14/777,331, filed as application No. PCT/US2014/028673 on Mar. 14, 2014, now Pat. No. 10,202,867.
(Continued)

(51) Int. Cl.
*F01D 5/08* (2006.01)
*F02C 7/12* (2006.01)

(52) U.S. Cl.
CPC .............. *F01D 5/082* (2013.01); *F01D 5/081* (2013.01); *F02C 7/125* (2013.01); *F05D 2270/3062* (2013.01)

(58) Field of Classification Search
CPC .. F02C 7/125; F05D 2270/3062; F01D 5/081; F01D 5/082
See application file for complete search history.

(56) References Cited

U.S. PATENT DOCUMENTS

| | | | |
|---|---|---|---|
| 3,452,542 A | 7/1969 | Saferstein et al. | |
| 3,584,458 A | 6/1971 | Wetzler | |
| (Continued) | | | |

FOREIGN PATENT DOCUMENTS

| | | |
|---|---|---|
| CN | 1971011 A | 5/2007 |
| CN | 1987066 A | 6/2007 |

OTHER PUBLICATIONS https://hardhatengineer.com/what-is-plug-valve-a-complete-guide-for-engineerdownloaded Jul. 16, 2020.*
(Continued)

*Primary Examiner* — Ted Kim
(74) *Attorney, Agent, or Firm* — McGarry Bair PC (57) ABSTRACT

A flow transfer apparatus for transferring cooling flow from a primary gas flowpath to a turbine rotor. The apparatus includes a first supply plenum communicating with the primary gas flowpath and first inducers, the first inducers configured to accelerate a first fluid flow from the first supply plenum and discharge it toward the rotor with a tangential velocity; a second supply plenum communicating with the primary gas flowpath and second inducers, the second inducers configured to accelerate a second fluid flow from the second supply plenum towards the rotor with a tangential velocity; and a cooling modulation valve operable to selectively permit or block the second fluid flow from the primary gas flowpath to the second supply plenum. The valve includes a flow control structure disposed in the
(Continued)

primary gas flowpath and an actuation structure extending to a location radially outside of a casing defining the primary gas flowpath.

8 Claims, 5 Drawing Sheets

Related U.S. Application Data

(60) Provisional application No. 61/798,903, filed on Mar. 15, 2013.

(56) References Cited

U.S. PATENT DOCUMENTS

| | | |
|---|---|---|
| 4,416,111 A | 11/1983 | Lenahan et al. |
| 4,462,204 A | 7/1984 | Hull |
| 4,815,928 A | 3/1989 | Pineo et al. |
| 5,575,616 A | 11/1996 | Hagle et al. |
| 6,050,079 A | 4/2000 | Durgin et al. |
| 10,202,867 B2 * | 2/2019 | Rahaim .................. F01D 5/082 |
| 2007/0116562 A1 | 5/2007 | West et al. |
| 2007/0137175 A1 | 6/2007 | Moniz |

OTHER PUBLICATIONS

PCT Search Report and Written Opinion issued in connection with corresponding PCT Application No. PCT/US2014/028673 dated Dec. 11, 2014.

Unofficial English translation of Chinese Office Action issued in connection with corresponding CN Application No. 201480016253.6 dated May 3, 2016.

* cited by examiner

MODULATED TURBINE COOLING SYSTEM

CROSS-REFERENCE TO RELATED APPLICATIONS

This application is a division of U.S. application Ser. No. 14/777,331, filed on Sep. 15, 2015, titled "MODULATED TURBINE COOLING SYSTEM", now U.S. Pat. No. 10,202,867, issued Feb. 12, 2019, which claims the benefit of PCT/US2014/028673, filed on Mar. 14, 2014, titled "MODULATED TURBINE COOLING SYSTEM", which claims priority to Provisional Patent Application Ser. No. 61/798,903 filed on Mar. 15, 2013, titled "MODULATED TURBINE COOLING SYSTEM". All of the above listed applications are herein incorporated by reference.

BACKGROUND OF THE INVENTION

Embodiments of the present invention relate to gas turbine engines and, more particularly, to methods and apparatus for providing cooling air to turbine airfoils within a gas turbine engine.

In a gas turbine engine, hot gas exits a combustor and is utilized by a turbine for conversion to mechanical energy. This mechanical energy drives an upstream high pressure compressor. The turbine comprises a plurality of rows of blades which are carried by a turbine rotor, alternating with rows of stationary nozzles. The turbine blades and nozzles are subjected to a flow of the corrosive, high-temperature combustion gases. These "hot section" components are typically cooled by a flow of relatively low-temperature coolant, such as air extracted (bled) from the compressor or compressor discharge air. Using air extracted from the cycle in this manner is chargeable to the thermodynamic cycle, increases specific fuel consumption ("SFC"), and is generally to be avoided or minimized whenever possible.

One known type of turbine cooling system uses inducers to collect compressor discharge air, accelerate it and turn it tangentially, and feed it to a turbine rotor. Typically, turbine cooling systems are physically configured to meet maximum cooling demand, as would be experienced during high-power operation such as takeoff or initial climb. This results in excess cooling capacity during other operating conditions such as cruise flight or descent. Cooling demand in these conditions is much lower and actually represents the majority of the time of engine operation.

Attempts have been made to modulate turbine cooling flow during other operating conditions. These typically require piping external to the engine case, which is subject to undesirable failure modes, or internally-actuated valves which are difficult to keep in good operating condition in the high-temperature environment within the engine.

Accordingly, there is a need for improved cooling systems which will provide cooling to an airfoil in a robust and economical manner.

BRIEF DESCRIPTION OF THE INVENTION

This need is addressed by embodiments of the present invention, which provide a turbine cooling system operable to modulate cooling flow to rotating turbine blades that are fed by an array of inducers. During engine operations, some of the inducers receive a constant flow of cooling air, while others are fed through a valved flowpath that can be selectively shut off.

In an embodiment of the invention, a modulated flow transfer apparatus is provided for transferring a cooling flow from a primary gas flowpath to a turbine rotor of a gas turbine engine, the apparatus including: a first supply plenum communicating with the primary gas flowpath and a plurality of first inducers, each of the first inducers configured to accelerate a first fluid flow received from the first supply plenum and discharge the first fluid flow toward the rotor with a tangential velocity component; a second supply plenum communicating with the primary gas flowpath and a plurality of second inducers, each of the second inducers configured to accelerate a second fluid flow received from the second supply plenum towards the rotor with a tangential velocity component; and a cooling modulation valve operable to selectively permit or block the second fluid flow from the primary gas flowpath to the second supply plenum, wherein the cooling modulation valve includes a flow control structure disposed in the primary gas flowpath and a valve actuation structure extending from the flow control structure to a location radially outside of a casing defining the primary gas flowpath.

In an embodiment of the invention, a method is provided of transferring a cooling flow from a primary gas flowpath to a turbine rotor of a gas turbine engine that has at least two different operating conditions. The method includes: during all conditions of engine operation, flowing a first fluid flow from the primary gas flowpath through a first supply plenum to a plurality of first inducers, each of the first inducers configured to accelerate the first fluid flow and discharge the first fluid flow toward the turbine rotor with a tangential velocity component; and during some but not all of the operating conditions, flowing a second fluid flow from the primary gas flowpath through a cooling modulation valve and a second supply plenum to a plurality of second inducers, each of the second inducers configured to accelerate the second fluid flow and discharge the second fluid flow towards the turbine rotor with a tangential velocity component; wherein the cooling modulation valve includes a flow control structure disposed in the primary gas flowpath and a valve actuation structure extending from the flow control structure to a location radially outside of a casing defining the primary gas flowpath.

BRIEF DESCRIPTION OF THE DRAWINGS

Embodiments of the invention may be best understood by reference to the following description taken in conjunction with the accompanying drawing figures in which.

DETAILED DESCRIPTION OF THE INVENTION

An embodiment of the present invention provides a system for modulating cooling flow to rotating turbine blades that are fed by an array of inducers. During engine operation, some of the inducers receive a constant flow of cooling air, while others are fed through a valved flowpath that can be selectively shut off during selected engine operating conditions.

Figure 1:
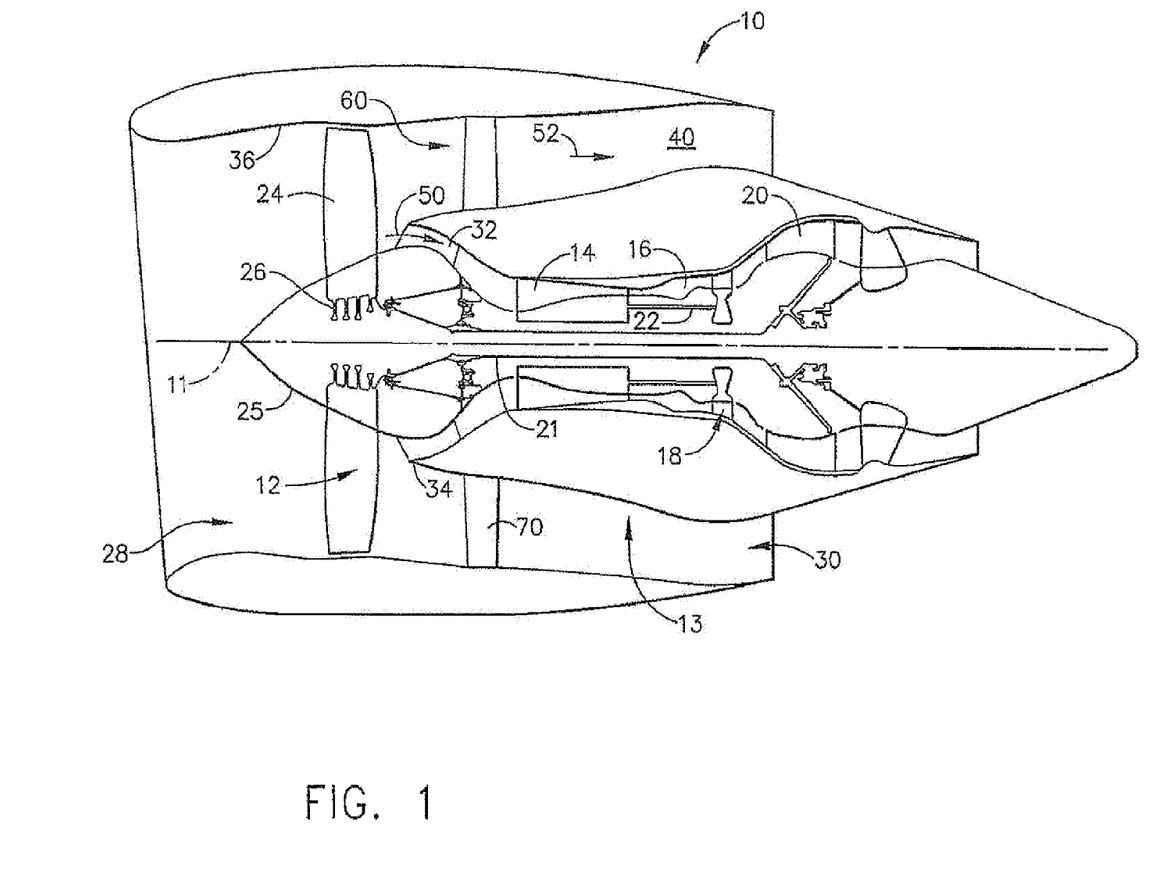
FIG. 1 is a cross-sectional illustration of an exemplary gas turbine engine.

Now, referring to the drawings wherein identical reference numerals denote the same elements throughout the various views, FIG. 1 illustrates an exemplary an exemplary gas turbine engine assembly 10 having a longitudinal axis 11. Gas turbine engine assembly 10 includes a fan assembly 12 and a core gas turbine engine 13. Core gas turbine engine 13 includes a high pressure compressor 14, a combustor 16, and a high pressure turbine 18. In the exemplary embodiment, gas turbine engine assembly 10 also includes a low pressure turbine 20, and a multi-stage booster compressor 32, and a splitter 34 that substantially circumscribes booster 32.

Fan assembly 12 includes an array of fan blades 24 extending radially outward from a rotor disk 26, the forward portion of which is enclosed by a streamlined spinner 25. Gas turbine engine assembly 10 has an intake side 28 and an exhaust side 30. Fan assembly 12, booster 22, and turbine 20 are coupled together by a first rotor shaft 21, and compressor 14 and turbine 18 are coupled together by a second rotor shaft 22.

In operation, air flows through fan assembly 12 and a first portion 50 of the airflow is channeled through booster 32. The compressed air that is discharged from booster 32 is channeled through compressor 14 wherein the airflow is further compressed and delivered to combustor 16. Hot products of combustion (not shown in FIG. 1) from combustor 16 are utilized to drive turbines 18 and 20, and turbine 20 is utilized to drive fan assembly 12 and booster 32 by way of shaft 21. Gas turbine engine assembly 10 is operable at a range of operating conditions between design operating conditions and off-design operating conditions.

A second portion 52 of the airflow discharged from fan assembly 12 is channeled through a bypass duct 40 to bypass a portion of the airflow from fan assembly 12 around core gas turbine engine 13. More specifically, bypass duct 40 extends between a fan casing or shroud 36 and splitter 34. Accordingly, a first portion 50 of the airflow from fan assembly 12 is channeled through booster 32 and then into compressor 14 as described above, and a second portion 52 of the airflow from fan assembly 12 is channeled through bypass duct 40 to provide thrust for an aircraft, for example. Splitter 34 divides the incoming airflow into first and second portions 50 and 52, respectively. Gas turbine engine assembly 10 also includes a fan frame assembly 60 to provide structural support for fan assembly 12 and is also utilized to couple fan assembly 12 to core gas turbine engine 13.

Fan frame assembly 60 includes a plurality of outlet guide vanes 70 that extend substantially radially between a radially outer mounting flange and a radially inner mounting flange and are circumferentially-spaced within bypass duct 40. Fan frame assembly 60 may also include a plurality of struts that are coupled between a radially outer mounting flange and a radially inner mounting flange. In one embodiment, fan frame assembly 60 is fabricated in arcuate segments in which flanges are coupled to outlet guide vanes 70 and struts. In one embodiment, outlet guide vanes and struts are coupled coaxially within bypass duct 40. Optionally, outlet guide vanes 70 may be coupled downstream from struts within bypass duct 40.

Fan frame assembly 60 is one of various frame and support assemblies of gas turbine engine assembly 10 that are used to facilitate maintaining an orientation of various components within gas turbine engine assembly 10. More specifically, such frame and support assemblies interconnect stationary components and provide rotor bearing supports. Fan frame assembly 60 is coupled downstream from fan assembly 12 within bypass duct 40 such that outlet guide vanes 70 and struts are circumferentially-spaced around the outlet of fan assembly 12 and extend across the airflow path discharged from fan assembly 12.

While the illustrated engine 10 is a high-bypass turbofan engine, the principles described herein are equally applicable to turboprop, turbojet, and turboshaft engines, as well as turbine engines used for other vehicles or in stationary applications.

Figure 3:
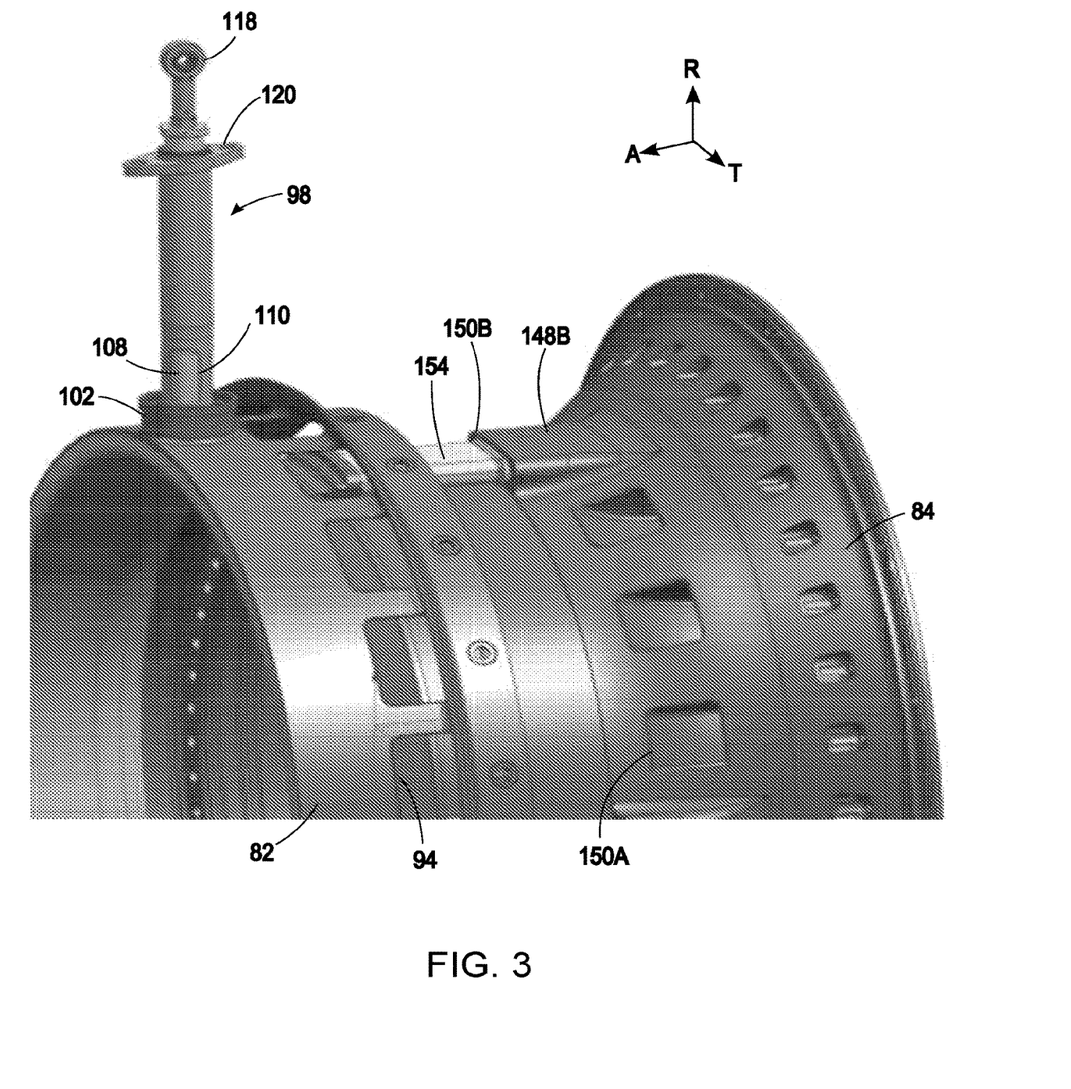
FIG. 3 is a perspective view of a portion of the turbine cooling system of FIG. 2.

It is noted that, as used herein, the term "axial" or "longitudinal" refers to a direction parallel to the longitudinal axis 11, while "radial" refers to a direction perpendicular to the axial direction, and "tangential" or "circumferential" refers to a direction mutually perpendicular to the axial and tangential directions. (See arrows "A", "R", and "T" in FIG. 3). As used herein, the terms "forward" or "front" refer to a location relatively upstream relative to the air flow passing through the engine 10, and the terms "aft" or "rear" refer to a location relatively downstream in an air flow passing through or around the engine 10. The direction of this flow is shown by the arrow "F" in FIG. 1. These directional terms are used merely for convenience in description and do not require a particular orientation of the structures described thereby.

Figure 2:
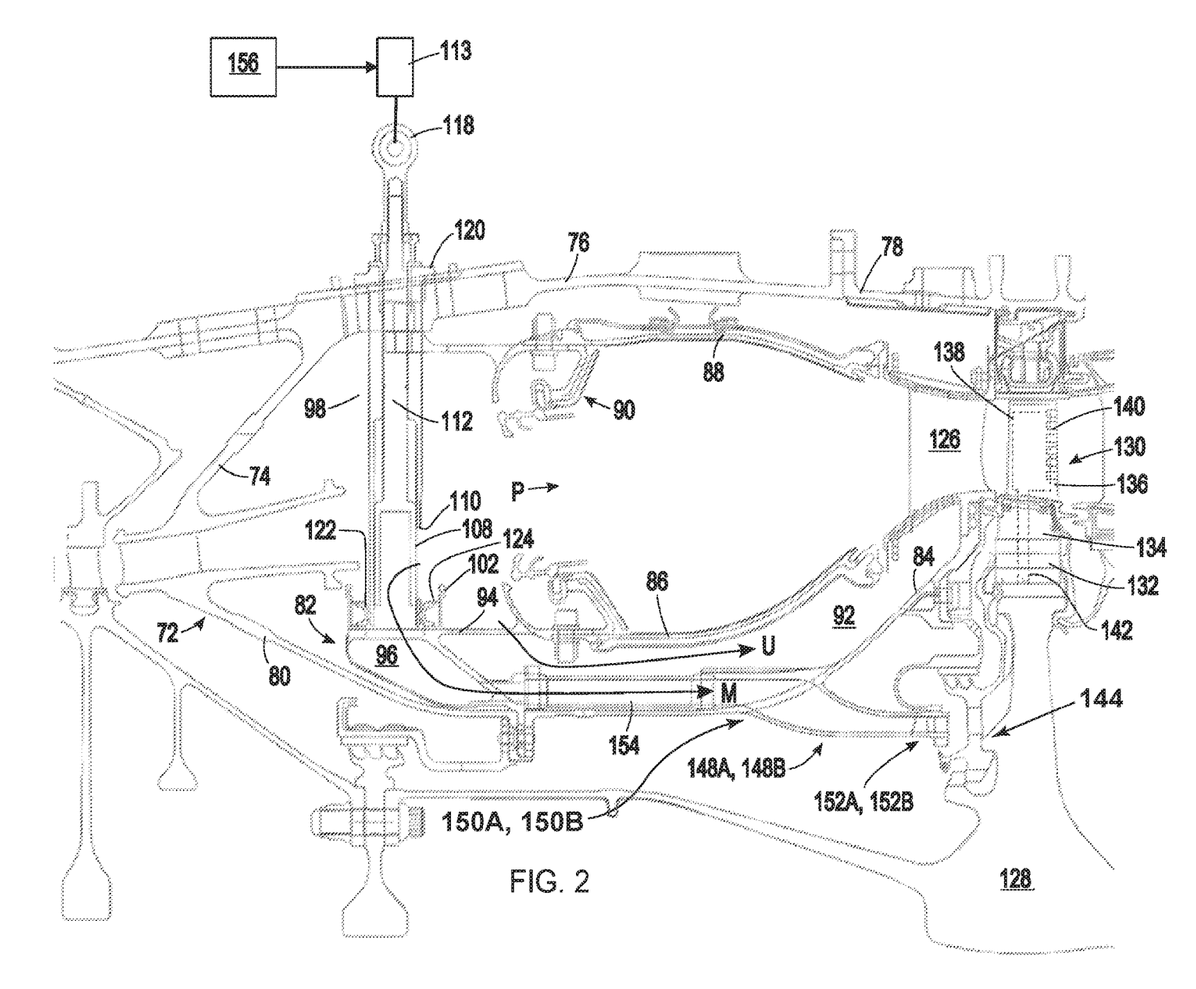
FIG. 2 is a half-sectional view of a portion of the engine of FIG. 1, illustrating a turbine cooling system constructed according to an aspect of the present invention.

FIG. 2 illustrates the combustor 16 and the engine structures immediately surrounding it in more detail. An annular diffuser 72 is disposed aft of the high pressure compressor 14 and serves to channel compressor discharge air to the combustor 16. An outer arm 74 of the diffuser 72 is connected to an annular combustor casing 76 which is in turn connected to an annular turbine casing 78.

An inner arm 80 of the diffuser 72 is connected to an annular combustor support 82 which is in turn connected to an annular structure referred to as a forward inner nozzle support 84.

The combustor 16 includes annular inner and outer liners 86 and 88, and an annular dome structure 90 at its forward end. The dome structure 90 is also connected to the combustor casing 76. Collectively, the diffuser 72, dome structure 90, inner liner 86, and outer liner 88 define a primary gas flowpath, labeled "P".

Collectively, the combustor support 80, the inner liner 86, and the inner nozzle support 84 define a first supply plenum 92 located radially inboard of the combustor 16. This first supply plenum 92 is open to the primary gas flowpath P through an array of passages 94 formed in the combustor support 80 (best seen in FIG. 3).

The combustor support 80 also defines an annular second supply plenum 96 disposed axially forward of the first supply plenum 92.

One or more cooling modulation valves 98 are provided which communicate with the primary gas flowpath P and the second supply plenum 96. One cooling modulation valve 98 is shown in FIG. 2 with the understanding that all of the cooling modulation valves 98 are of identical construction.

The cooling modulation valve 98 incorporates a flow control structure disposed in the primary gas flowpath P, and a valve actuation structure extending from the flow control structure outside the combustor casing 76. As used herein, the term "flow control structure" refers to the elements of the cooling modulation valve 98 used to actually define a fluid flowpath and either permit or block flow through that flowpath. As used herein, the term "valve actuation structure" refers to the elements of the cooling modulation valve 98 used to physically operate the flow control structure.

In the illustrated example (seen in FIGS. 2, 4, and 5) the cooling modulation valve 98 includes a generally cylindrical valve body 100 that extends from a collar housing 102 of the second supply plenum 96 to the combustor casing 76. The radially inner end 104 of the valve body 100 incorporates a cylindrical bore 106 that receives a piston 108. One or more windows 110 are formed through the radially inner end 104, communicating with the bore 106. The piston 108 is moveable between a closed position (FIG. 4) in which it blocks flow between the windows 110 and the bore 106, and an open position (FIG. 5) in which it permits flow from the windows 110 to the bore 106, and thence to the second supply plenum 96. The piston 108, bore 106, and windows 110 collectively define the "flow control structure" for the illustrated cooling modulation valve 98.

Figure 4:
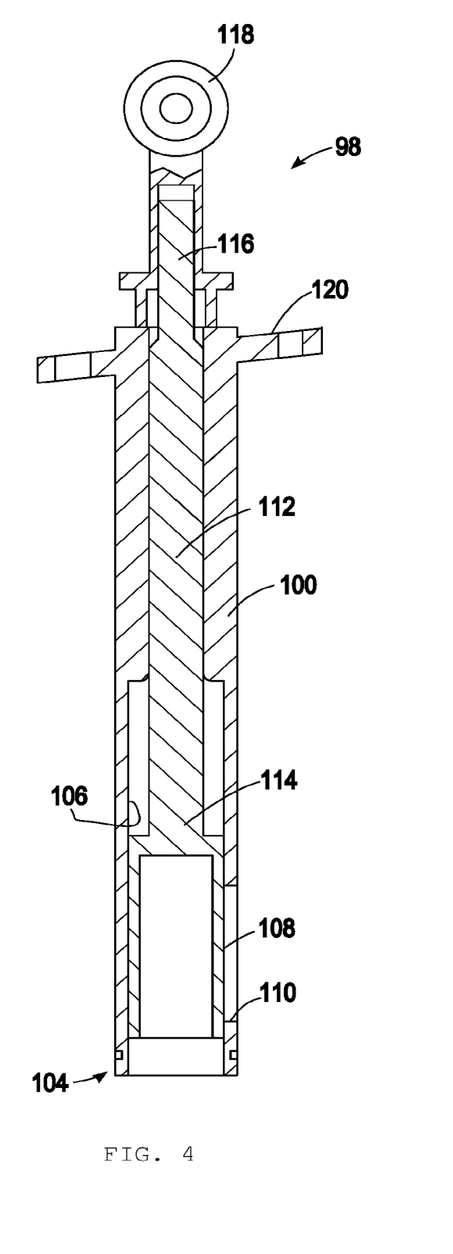
FIG. 4 is a cross-sectional view of a cooling modulation valve in a closed position.
Figure 5:
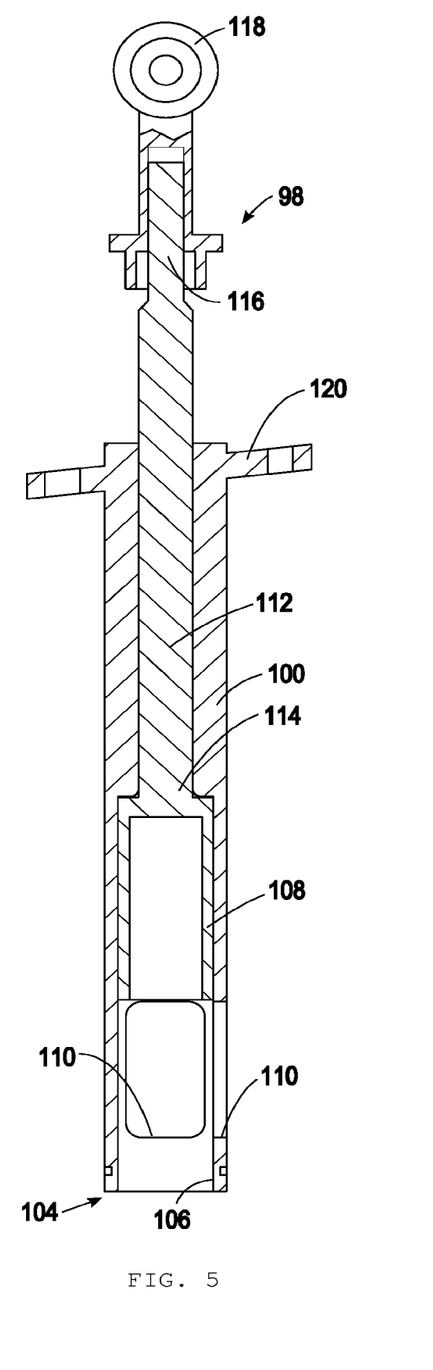
FIG. 5 is a cross-sectional view of the cooling modulation valve in an open position.

An operating rod 112 is disposed in the valve body 100 and has a lower end 114 connected to the piston 108 and an upper end 116 extending outside of the combustor casing 76, terminated with a suitable connector 118 such as the illustrated rod end bearing. The operating rod 112 may be integral with the piston 108. The operating rod 112 is connected to a suitable actuator (e.g. mechanical, electrical, pneumatic, or hydraulic—shown schematically at 113) operable to move the operating rod 112 between the two valve positions. The operating rod 112 defines the "valve actuation structure" of the cooling modulation valve 98. The cooling modulation valve 98 may be of a "modulating" type, capable of moving to intermediate positions, but it is believed that a valve using only two positions—fully opened or fully closed—provides better reliability in the operating environment of a gas turbine engine.

A radially outer end of the valve body 100 includes a flange 120 fixed to the combustor casing 76, for example using threaded fasteners (not shown). The radially inner end of the valve body 100 is received in the collar housing 102. A ring-like collar 122 is disposed in the collar housing 102 surrounding the inner end 100 and sealed to the inner end 100 and the collar housing 102, for example using the illustrated piston rings 124. This provides an air seal while permitting relative radial movement of the valve body 100 and the combustor support 82, thereby accommodating unequal thermal growth during engine operation.

Figure 6:
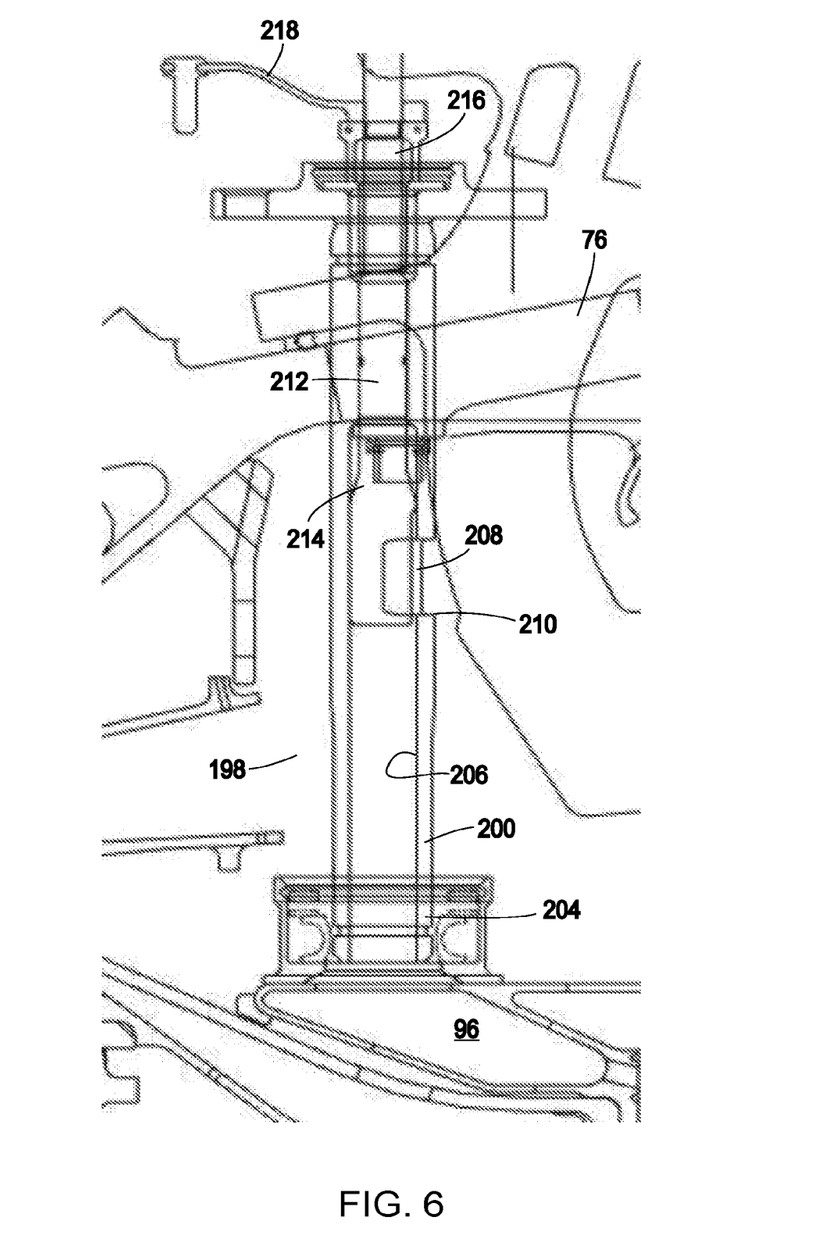
FIG. 6 is a cross-sectional view of a portion of the turbine cooling system incorporating an alternative cooling modulation valve.

The linear-acting valve 98 described above has certain desirable properties. In particular it exhibits good sealing properties and if the actuator 113 should fail, prevailing fluid pressure tends to open the valve 98, ensuring that cooling air is supplied. Other types of valves may be used. For example, FIG. 6 depicts an alternative cooling modulation valve 198 including a generally cylindrical valve body 200. A radially inner end 204 of the valve body 200 incorporates a cylindrical bore 206 that receives a plug 208. A window 210 is formed through the radially inner end 204, communicating with the bore 206. The plug 208 is generally "D"-shaped in cross-section and is rotatable between a closed position in which it blocks flow between the window 210 and the bore 206, and an open position in which it permits flow from the window 210 to the bore 206, and thence to the second supply plenum 96. The plug 208, bore 206, and window 210 collectively define the "flow control structure" for the illustrated cooling modulation valve 198. An operating rod 212 is disposed in the valve body 200 and has a lower end 214 connected to the plug 208 and an upper end 216 extending outside of the combustor casing 76, terminated with a suitable connector 218 such as the illustrated crank arm. The connector 218 is connected to a suitable actuator (e.g. mechanical, electrical, pneumatic, or hydraulic—not shown) operable to move the operating rod 212 between the two valve positions. The operating rod 212 defines the "valve actuation structure" of the cooling modulation valve 198.

Referring back to FIG. 2, as turbine nozzle comprising a row of stationary airfoil-shaped nozzle airfoils or vanes 126 is disposed at the downstream end of the combustor 16 and physically supported by the forward inner nozzle support 84.

A turbine rotor comprising a rotatable disk 128 carrying a row of airfoil-shaped turbine blades 130 is disposed immediately downstream of the turbine nozzle airfoils 126. Each turbine blade 130 includes a dovetail 132, shank 134, and an airfoil 136. The interior space 138 of the airfoil 136 is hollow and may include any one of a number of known cooling configurations including, for example, parallel radial or serpentine flow channels with various structures such as turbulators formed therein for improving cooling air effectiveness. The spent cooling air from the airfoil interior space 138 may be discharged through passages such as trailing edge slots 140. The cooling air is fed to the airfoil 136 through one or more feed channels 142 extending through the dovetail 132 and shank 134 into the airfoil 136.

An annular rotating seal member 144 is mounted to the forward face of the disk 128, and has an array of cooling inlet holes 146 formed therein. In combination with the disk 128, the rotating seal member 144 defines a flowpath for cooling air from the cooling inlet holes 146 to the turbine blades 130.

The inner nozzle support 84 incorporates a plurality of inducers 148A, 148B. The inducers 148A, 148B are individual conduits which are shaped, sized, and positioned to channel airflow in a direction substantially tangential to the rotor and to accelerate airflow to a velocity substantially equal to the tangential velocity of the seal member 144.

Some of the inducers are referred to herein as "unmodulated inducers" and designated 148A. They have an upstream end 150A communicating directly with the first supply plenum 92, and a downstream end 152A positioned immediately upstream of the rotating seal member 144. The air flowpath from the diffuser 72 through the passages 94 and the first supply plenum 92 to the unmodulated inducers 148A is shown at arrow "U" in FIG. 2.

Some of the inducers are referred to herein as "modulated inducers" and designated 148B. Each have an upstream end 150B communicating with the second supply plenum 96 through an axially-extending transfer tube 154, and a downstream end 152B positioned immediately upstream of the rotating seal member 144. The air flowpath from the diffuser 72 through the cooling modulation valve 98 and the second supply plenum 96 to the modulated inducers 148B is shown at arrow "M" in FIG. 2.

When the cooling modulation valve (or valves) 98 is open, the flowpath M supplies air from the primary gas flowpath P to the modulated inducers 148B. When the cooling modulation valve (or valves) 98 is closed, no airflow is provided to the modulated inducers 148B.

The cooling system is implemented for a particular engine so that all turbine cooling and purge flow requirements are met when all of the inducers 148A and 148B are flowing, during most demanding or "worst case" engine operating conditions, such as takeoff. This involves consideration of seal flows, leakage rates, and cooling hole sizing, as well as the sizing of the valves, plenums, and passages within the system.

A number of unmodulated inducers 148A is selected such that that all turbine cooling and purge flow is met when only the unmodulated inducers 148A are flowing, during less demanding, more prevalent engine operating conditions, such as high-altitude cruise. The modulated inducers 148B are operated when higher cooling flows are needed. This flow through the modulated inducers 148B is closed off at a time when there is excess cavity purge flow and turbine blade cooling air beyond what is needed to meet design requirements for purge flow, disk and other hardware temperatures and blade metal temperature and backflow margin. For example, an engine control device such as a full authority digital engine control ("FADEC") of a known type, shown schematically at 156 in FIG. 2, may be coupled to appropriate sensors and may command the actuators 113 to open the cooling modulation valves 98 as needed.

In an embodiment of the system described above, fuel burn is reduced and engine performance improved, while still providing adequate cooling as required.

The foregoing has described a turbine cooling system and a method of its operation for a gas turbine engine. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A method of transferring a cooling flow from a primary gas flowpath to a turbine rotor of a gas turbine engine that has at least two different operating conditions, the method comprising:

during all conditions of engine operation, flowing a first fluid flow from the primary gas flowpath through a first supply plenum to a plurality of first inducers, each of the first inducers configured to accelerate the first fluid flow and discharge the first fluid flow toward the turbine rotor with a tangential velocity component; and during some but not all of the operating conditions, flowing a second fluid flow from the primary gas flowpath through a cooling modulation valve and a second supply plenum to a plurality of second inducers, each of the second inducers configured to accelerate the second fluid flow and discharge the second fluid flow towards the turbine rotor with a tangential velocity component;

wherein the cooling modulation valve comprises a flow control structure disposed in the primary gas flowpath and a valve actuation structure extending from the flow control structure to a location radially outside of a casing defining the primary gas flowpath; and wherein the flow control structure comprises a valve body with a cylindrical bore and a window formed through the body, communicating with the bore and a piston received in the bore and translatable between a closed position in which it blocks flow between the window and the bore, and an open position in which it permits flow from the window to the bore.

2. The method of claim 1 wherein the first supply plenum is defined in part by an annular space between an inner combustor liner and an annular inner nozzle support.

3. The method of claim 1 wherein the second supply plenum is disposed immediately axially upstream of the first supply plenum.

4. The method of claim 1 wherein the second fluid flow is transferred from the second supply plenum to each of the second inducers by an axially-extending transfer tube disposed within the first supply plenum.

5. The method of claim 1 wherein an operating rod is disposed in the valve body and has a lower end connected to the piston and an upper end extending outside of the casing.

6. The method of claim 5 wherein an actuator is disposed outside the casing and coupled to the upper end of the operating rod.

7. The method of claim 1 wherein:

the cooling modulation valve comprises a generally cylindrical valve body that extends in a radial direction from a collar housing of the second supply plenum to the casing; and the valve body is moveable in a radial direction relative to the collar housing.

8. The method of claim 7 wherein a ring-like collar is disposed within the collar housing surrounding an inner end of the valve body.

* * * * *

UNITED STATES PATENT AND TRADEMARK OFFICE
CERTIFICATE OF CORRECTION

| | | |
|---|---|---|
| PATENT NO. | : 11,092,013 B2 | Page 1 of 1 |
| APPLICATION NO. | : 16/236018 | |
| DATED | : August 17, 2021 | |
| INVENTOR(S) | : Rahaim et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 203 days.

Signed and Sealed this
Twenty-fifth Day of October, 2022

Katherine Kelly Vidal
*Director of the United States Patent and Trademark Office*